(12) United States Patent
Nathan et al.

(10) Patent No.: US 7,709,763 B2
(45) Date of Patent: May 4, 2010

(54) ROTATIONAL BASED ACTUATOR CONFIGURED TO IMPART LINEAR MOVEMENT

(75) Inventors: John F. Nathan, Highland, MI (US); H. Winston Maue, Northville, MI (US)

(73) Assignee: Lear Corporation, Southfield, MI (US)

( * ) Notice: Subject to any disclaimer, the term of this patent is extended or adjusted under 35 U.S.C. 154(b) by 517 days.

(21) Appl. No.: 11/734,902

(22) Filed: Apr. 13, 2007

(65) Prior Publication Data

US 2008/0253030 A1    Oct. 16, 2008

(51) Int. Cl.
*H01H 19/14* (2006.01)

(52) U.S. Cl. .................. 200/564; 200/572; 74/99 A; 310/369

(58) Field of Classification Search .......... 200/564, 200/336; 74/89.34, 99 R, 99 A; 310/80, 310/316, 317, 314, 369, 370, 316.01
See application file for complete search history.

(56) References Cited

U.S. PATENT DOCUMENTS

| | | | |
|---|---|---|---|
| 3,889,490 A * | 6/1975 | Nadolny | 464/23 |
| 3,973,799 A | 8/1976 | Berg | |
| 4,394,047 A | 7/1983 | Brunelle | |
| 4,489,248 A * | 12/1984 | Petersen | 310/76 |
| 4,660,235 A | 4/1987 | Plume | |
| 6,375,246 B1 | 4/2002 | Nicola et al. | |
| 6,513,875 B1 | 2/2003 | Gray et al. | |
| 6,832,815 B2 | 12/2004 | O'Connor | |
| 6,860,561 B2 | 3/2005 | Takata | |
| 6,932,409 B2 | 8/2005 | Falchero et al. | |
| 7,094,982 B2 * | 8/2006 | Liu | 200/336 |
| 2002/0162410 A1 * | 11/2002 | Zimmerman | 74/89.35 |
| 2004/0217638 A1 | 11/2004 | Shao | |
| 2005/0264074 A1 | 12/2005 | Holdampf | |
| 2006/0066144 A1 | 3/2006 | Tsujibayashi et al. | |

FOREIGN PATENT DOCUMENTS

| | | |
|---|---|---|
| EP | 1410945 A1 | 4/2004 |
| EP | 1516773 A1 | 3/2005 |
| EP | 1645460 A1 | 4/2006 |
| EP | 1787857 A1 | 5/2007 |

* cited by examiner

*Primary Examiner*—Edwin A. Leon
*Assistant Examiner*—Vanessa Girardi
(74) *Attorney, Agent, or Firm*—Brooks Kushman P.C.

(57) ABSTRACT

A rotational based actuator configured to impart linear movement. The actuator may be suitable for use in any number of applications where a disk or other feature may be rotated over a wedge to impart linear movement. The forces used to generate the rotation movement may be imparted by the wedge against an element, causing the element to move linearly with the disk.

19 Claims, 5 Drawing Sheets

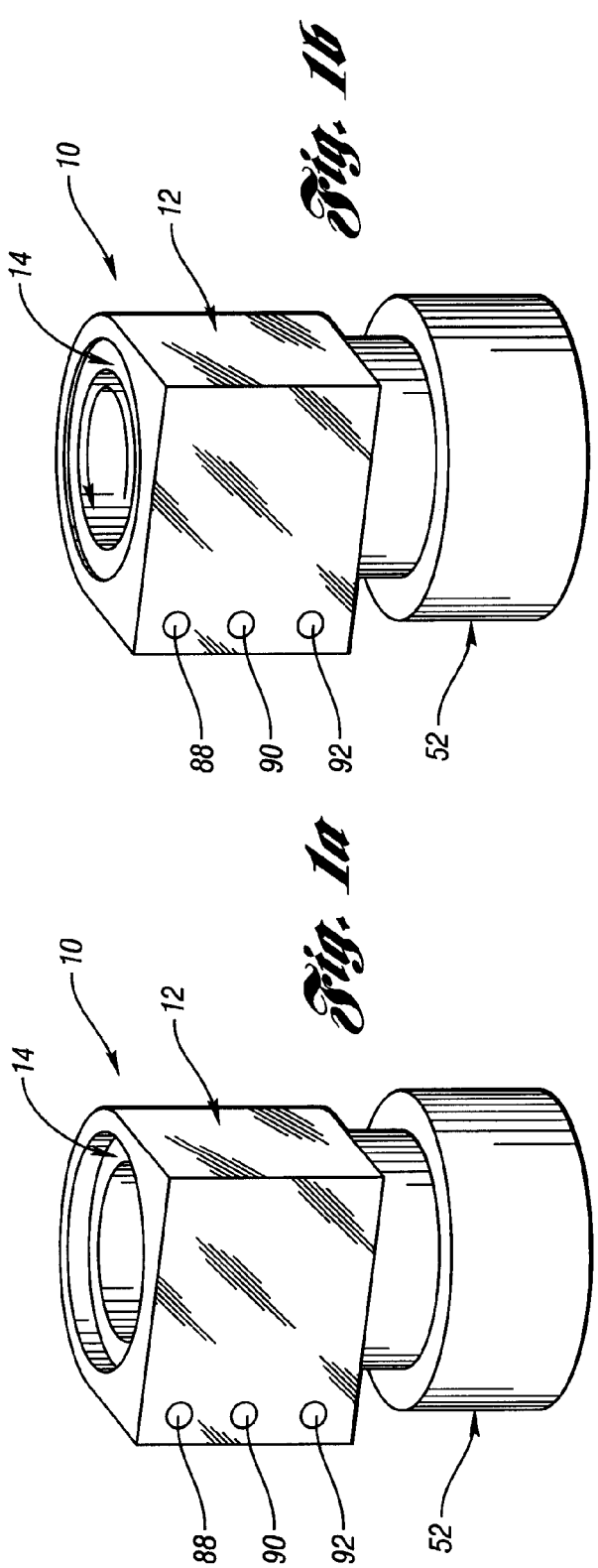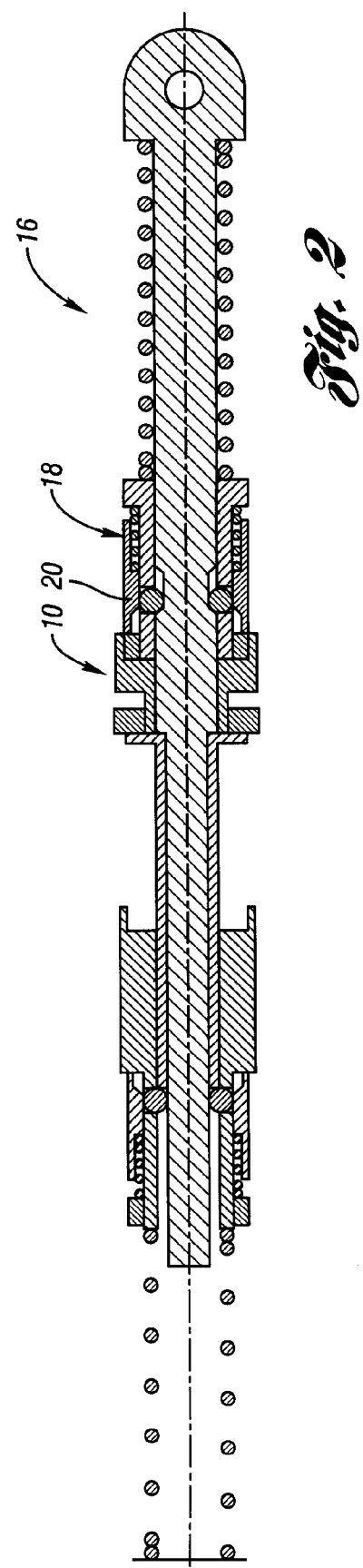

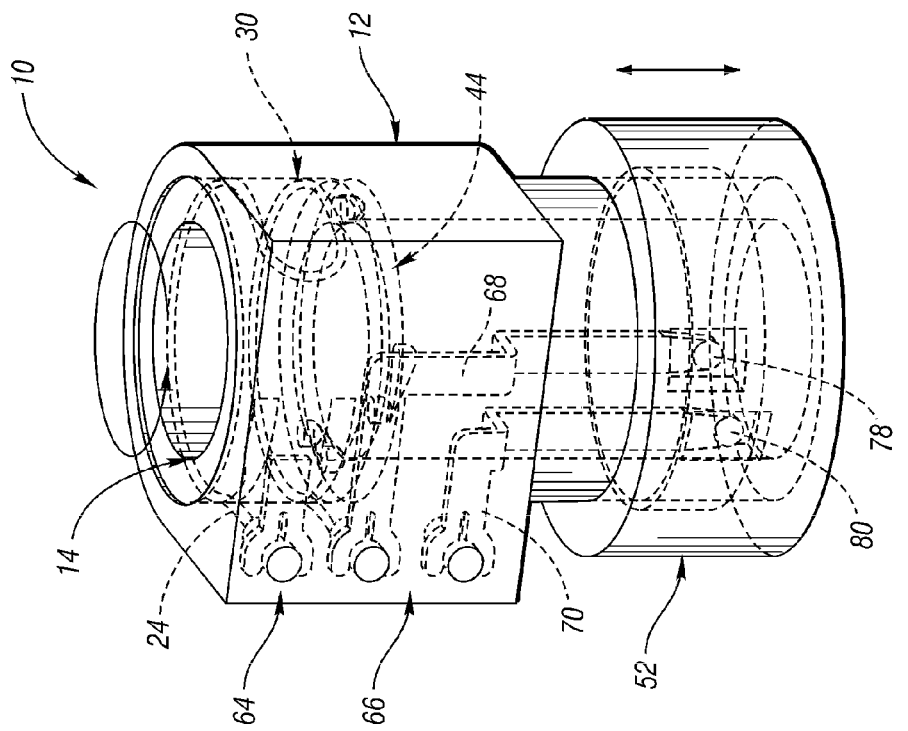
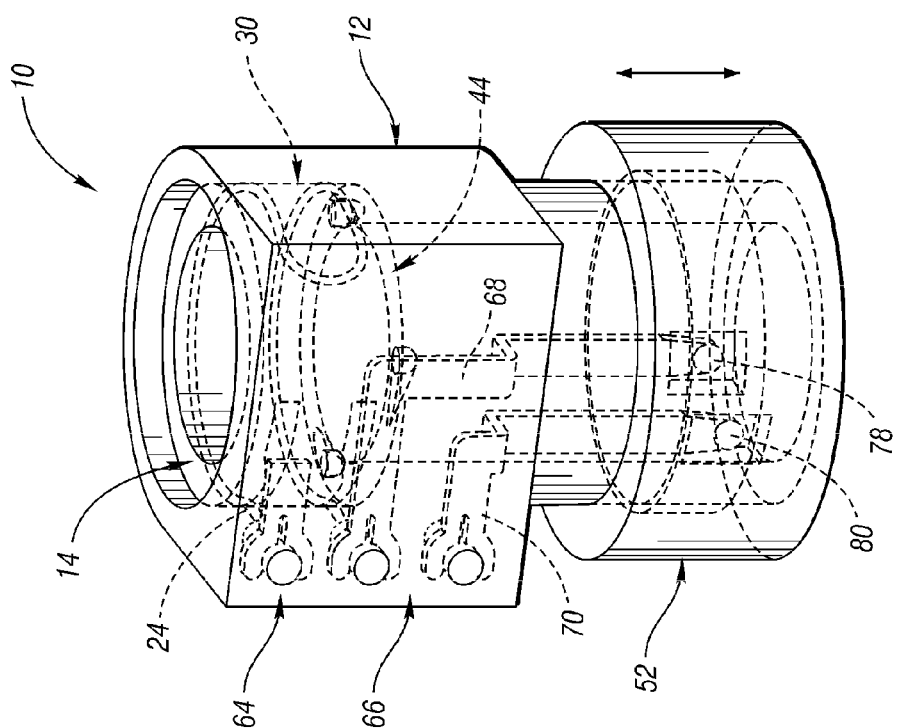

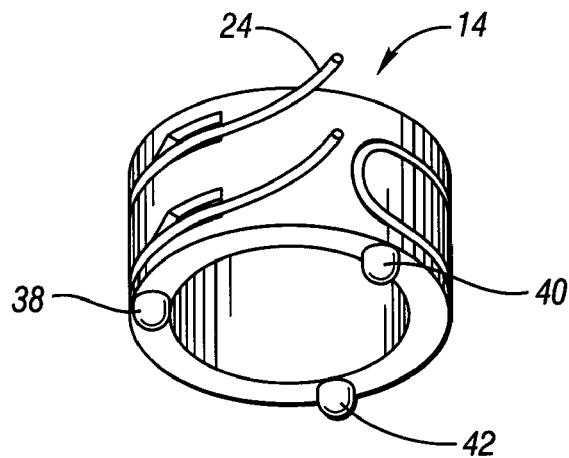
*Fig. 4a*
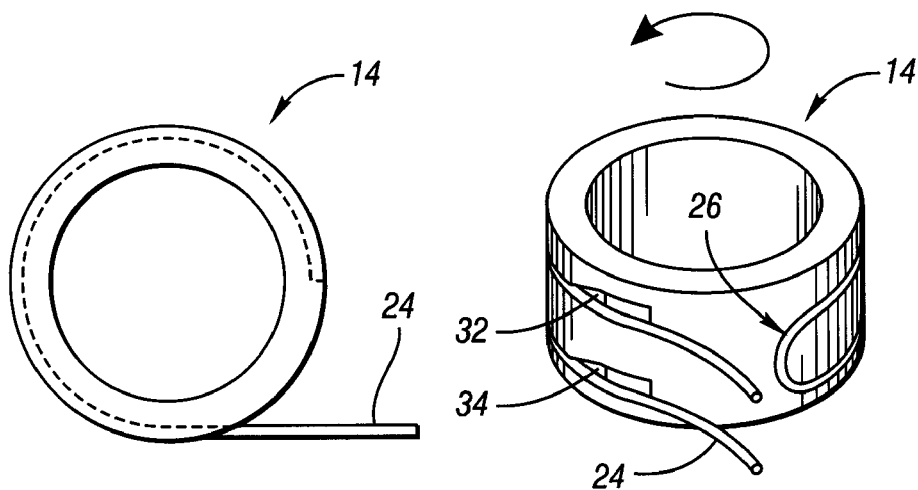
*Fig. 4b*  *Fig. 4c*
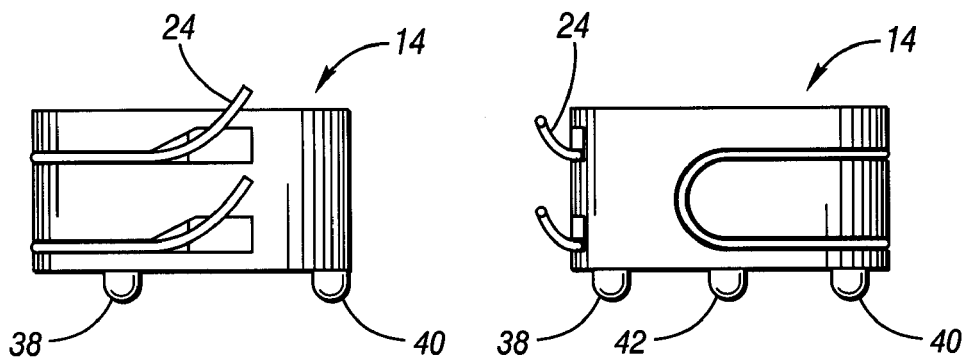
*Fig. 4d*  *Fig. 4e*

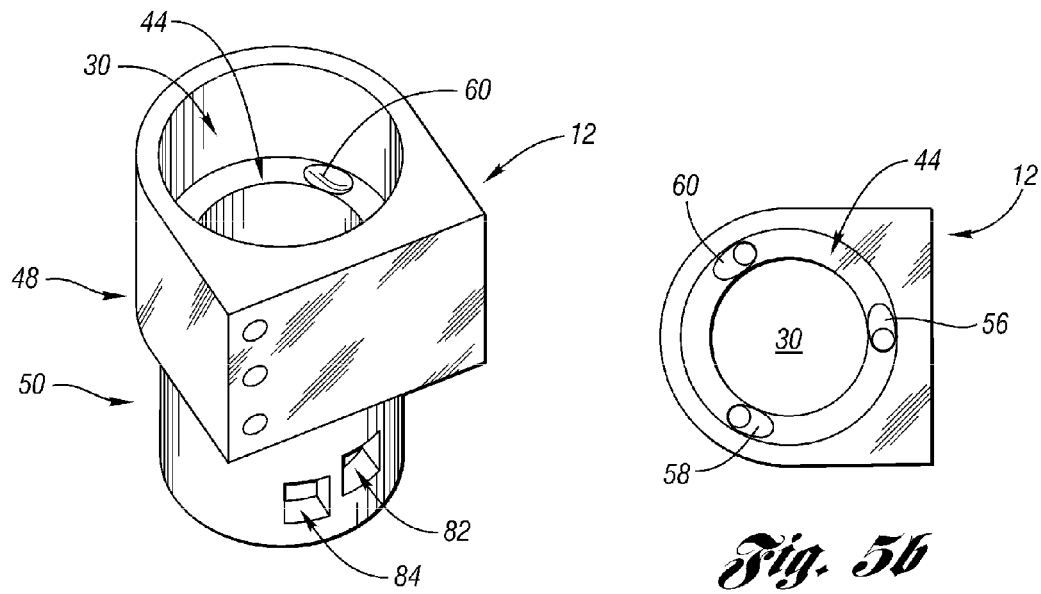
*Fig. 5a*
*Fig. 5b*
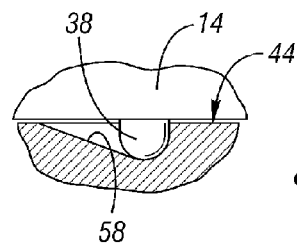
*Fig. 6a*
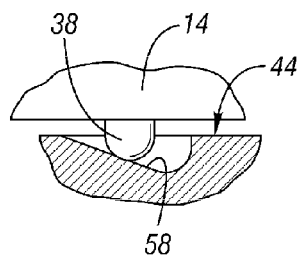
*Fig. 6b*
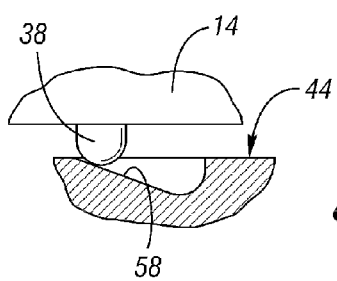
*Fig. 6c*

ROTATIONAL BASED ACTUATOR CONFIGURED TO IMPART LINEAR MOVEMENT

BACKGROUND OF THE INVENTION

1. Field of the Invention

The present invention relates to rotational based actuators configured to impart linear movement.

2. Background Art

Actuators used to impart linear movement may apply linear forces to an element in order to actuate or otherwise move the element. Actuators may be characterized as linear actuators if they are configured to move the element linearly along an axis of movement. Actuators may be used in any number of environments and to support any number of applications.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIGS. 1a-1b illustrate an actuator in accordance with one non-limiting aspect of the present invention;

FIG. 2 illustrates a seat back actuator having the actuator in accordance with one non-limiting aspect of the present invention;

FIGS. 3a-3b illustrates an electric element used to facilitate rotating a disk in accordance with one non-limiting aspect of the present invention;

FIGS. 4a-4e illustrate the disk and electric element in accordance with one non-limiting aspect of the present invention;

FIGS. 5a-5b illustrate a housing in accordance with one non-limiting aspect of the present invention;

FIGS. 6a-6c illustrate interaction between tabs and ramps in accordance with one non-limiting aspect of the present invention;

DETAILED DESCRIPTION OF THE PREFERRED EMBODIMENT(S)

Figure 7A:
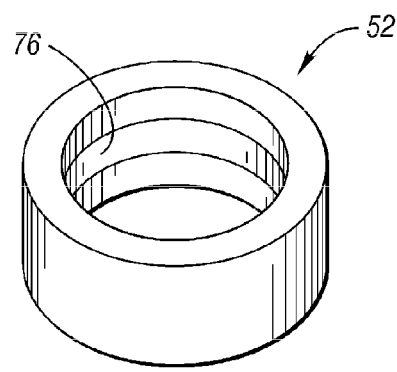
FIGS. 7a-7b illustrate a collar in accordance with one non-limiting aspect of the present invention.

FIGS. 1a-1b illustrate an actuator 10 in accordance with one non-limiting aspect of the present invention. The actuator 10 may include a housing 12 having a disk 14 configured to rotate, as described in more detail below, and move linearly within the housing 12 from the position shown in FIG. 1a to the position shown in FIG. 1b. The disk 14 may be positioned relative to an element (not shown) such that the linear disk movement induces a similar linear movement in the element.

FIG. 2 illustrates a seat back actuator 16 having the actuator 10 adapted to operate therewith in accordance with one non-limiting aspect of the present invention. The actuator 10 may be used with a release mechanism 18 to linearly actuate a slide collar (element) 20. In this manner, the actuator 10 may be a "collar actuator" used to facilitate operations associated with the release mechanism of the seat back actuator utilized in United States Patent Application entitled Seat Fold Actuator, filed on Apr. 13, 2007, having Ser. No. 11/734,950, the disclosure of which is hereby incorporated in its entirety.

FIGS. 3a-3b illustrates an electric element 24 used to facilitate rotating the disk 14 in accordance with one non-limiting aspect of the present invention. The electric element 24 relates to a feature that wraps at least partially around the disk 14 and contracts with electrical stimulation. Such a feature may be a wire, such as but not limited to a Smart Memory Alloy (SMA), or other feature having capabilities to contract (or expand) in response to electrical stimulation. This contraction may be used to rotate the disk 14 in a counter-clockwise direction such that it moves linearly within the housing 12 from the position shown in FIG. 3a to the position shown in FIG. 3b.

FIGS. 4a-4e illustrate the disk 14 and electric element 24 in accordance with one non-limiting aspect of the present invention. The disk 14 is shown to be generally circular with an elongated body having a hollow center. This configuration, however, is shown for exemplary purposes only and without intending to limit the scope and contemplation of the present invention. The disk 14 may be shaped and sized to any configuration suitable to executing the operations of the present invention, i.e., any configuration that allows rotate of the disk to impart linear movement.

The electric element 24 is shown to be wrapped around an outer portion of the disk in a u-shaped pattern characterized by an end portion 26 of the electric element forming a u-shape. The electric element 24 may be located within a recess of the disk 14 so that the outer portion of the disk is free to slide against and within a receptacle 30 of the housing 12. Stops or other features 32, 34 may be include on the disk 14 to prevent retraction of the electric element 24 when electrically stimulated. While shown to be positioned on the outside of the disk 14 and within the recess, the electric element 24 may be positioned any where on the disk 14 and/or it may be integrated into the disk 14 or features of the disk 14.

The disk 14 may further include one or more protuberances (tabs) 38, 40, 42 on a bottom side. The tabs 38, 40, 42 may be equally spaced and sized around the bottom of the disk 14 and configured to rest upon a shoulder 44 of the receptacle 30. The tabs 38, 40, 42 are shown to be discrete elements and equally spaced for exemplary purposes only. The present invention fully contemplates the use of more or less tabs 38, 40, 42 in any number of configurations and shapes, such as but not limited to the use of a single tab having a spiral shape or steady incline around the bottom side of the disk.

FIGS. 5a-5b illustrate the housing 12 in accordance with one non-limiting aspect of the present invention. The housing 12 may include a top portion 48 and a bottom portion 50. The disk 14 may be positioned relative to the top portion 48. A collar 52 (see FIG. 1a) may be positioned relative to the bottom portion 50 such that the two pieces never overlap. The housing 12 may include the receptacle 30 being accessible through an opening at one end through which the disk 14 may be easily inserted for positioning relative to the receptacle shoulder 44.

The receptacle 30 is shown to be generally circular with an elongated body having a hollow center. This configuration, however, is shown for exemplary purposes only and without intending to limit the scope and contemplation of the present invention. The receptacle 30 may be shaped and sized to any configuration suitable to executing the operations of the present invention, i.e., any configuration that allows of the receptacle to support disk rotation and linear movement.

The receptacle shoulder 44 may be of a smaller diameter or size than the opening and/or the disk 14 so as to provide a surface upon which the disk 14 may rest. The shoulder 44 may also include one or more inclines or ramps 56, 58, 60. The ramps 56, 58, 60 may be used in cooperation with the tabs 38, 40, 42 on the bottoms side of the disk 14 to facilitate imparting linear movement to the disk 14 when the tabs 38, 40, 42 are rotated over the ramps 56, 58, 60. The housing 12 is shown to include three ramps 56, 58, 60 that correspond with the size and shape of the three tabs 38, 40, 42. The ramps 56, 58, 60 are shown to be discrete elements and equally spaced for exemplary purposes only. The present invention fully contemplates the use of more or less ramps 56, 58, 60 in any number of configurations and shapes, such as but not limited to the use of a single ramp having a spiral shape or steady incline around the shoulder.

FIGS. 6a-6c illustrate interaction between the tabs 38, 40, 42 and ramps 56, 58, 60 in accordance with one non-limiting aspect of the present invention. For exemplary proposes, a single tab 38 and ramp 58 is shown with the understanding that the other tabs and ramps operate in at least substantially the same manner. With rotation of the disk 14, the tab 38 starts from a seated position at which the tab 38 resting below the shoulder 44 and the bottom of the disk 14 rests against the shoulder 44 (FIG. 6a) to any number of other positions (FIGS. 6b-6c) at which the disk 14 is located at a first distance away from the shoulder 44 (FIG. 6b) or at a second distance away from the shoulder 44 (FIG. 6c), depending on position of the tab 38 with respect to the incline 58.

The rotation of the disk 14 between the various positions may be controlled by controlling electrical stimulation of the electric element 24, such as but not limited control based on controlling current flow to the electric element 24. In this manner, the linear movement (distance from the shoulder 44) of the disk 14 may be controlled by controlling its rotation and positioning with respect to the ramp 58. The height of the ramp 58 may be used to control the maximum linear movement capabilities of the disk 14 in so far as the disk 14 may be limited to providing linear movement equal to a height of the ramp 58 relative to the shoulder 44. The height of the tab 38 may need to correspond with the height of the ramp 58 so that the disk 14 can rest against the shoulder 44 when seated.

A controller (not shown) may be configured to control electrical stimulation of the electric element 24 wrapped around the disk 14 so as to control rotation of the disk 14. The controller may be configured to control the electrical stimulation to facilitate movement of the disk 14 from the seated position to any number of the other positions. The controller may receive inputs from other devices and/or users and to control electrical stimulation of the electric element 24 as a function thereof and to support any number of operations associated with the use of the actuator. Force from the element against the disk 14, a spring (not shown), or other feature may be included or operate in cooperation with the actuator 10 to facilitate returning the disk 14 to the seated or an intermediate position when the electric element 24 is no longer contracted or the contraction thereof is controllably reduced.

Returning to FIGS. 3a-3b, the electric element 24 may be connected to a positive connection 64 and a negative connection 66 to facilitate controlling current flow therethrough. The positive connection 64 may be associated with a power supply and the negative connection 66 may be associated with a ground or return path. The negative connection 66 may include two terminals 68, 70. One terminal 68 may be internally connected to an end of the electric element 24 and another of the terminals 70 may be connected to the external ground. The collar 52 may include a conducting band 76 to facilitate connecting and disconnecting the terminals 68, 70 to each other, and thereby, connecting and disconnecting the positive and negative connections 64, 66.

Figure 7B:
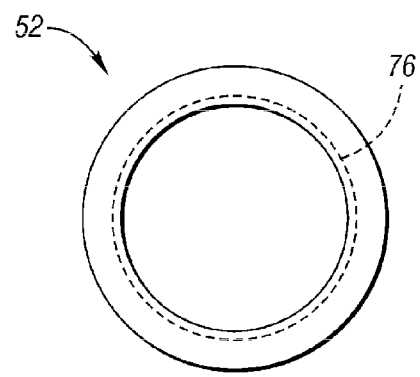

FIGS. 7a-7b illustrate the collar 52 in accordance with one non-limiting aspect of the present invention. The collar 52 may be shaped and sized to correspond with the bottom portion of the housing 12 such that it may slide axially along the housing 12. The conducting band 76 may be located proximate the middle portion of the collar on an inside portion facing the housing 12. The terminals 68, 70 may include spring biased protuberances 78, 80 (see FIGS. 3a-3b) or other features which allow a portion of the terminals to extend outwardly from openings 82, 84 in the housing 12 (see FIG. 5a) such that the terminals 68, 70 may be mainly located behind the outer surface of the housing 12 except for the portions extending through the openings 82, 84.

Figure 8A:
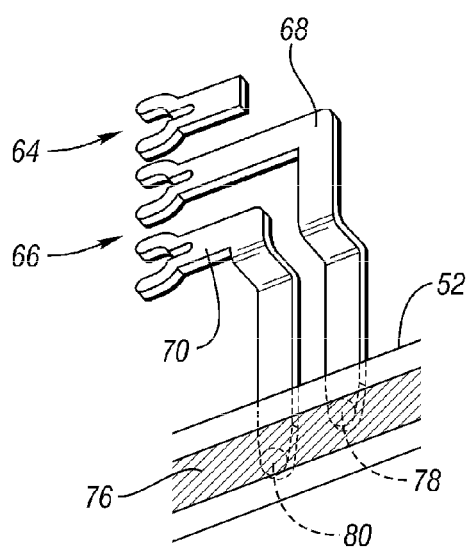
FIGS. 8a-8b illustrate operation of the collar in accordance with one non-limiting aspect of the present invention.
Figure 8B:
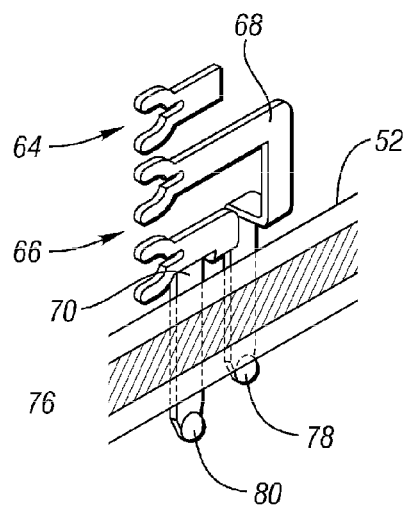

FIGS. 8a-8b illustrate operation of the collar 52 in accordance with one non-limiting aspect of the present invention. These Figures illustrate the positive connection and negative connections 64, 66, with the negative connection portions including the two terminals 68, 70. The positive connection 64 may be connected to a power supply and at one end of the electric element 24, one of the terminals 68 may be connected to the other end of the electric element 24, and the other one of the terminals 70 may be connected to ground. This arrangement may be used to facilitate current flow from the power supply, through the electric element 24, through the first terminal 68, through the conducting band 76, through the second terminal 70, and finally to ground. Openings may be included on the housing to facilitate access to the connections and terminals, such as to facilitate testing, manufacturing, and/or connecting power and ground.

The collar 52 may move axially along the housing 12 to connect and disconnect the positive and negative connections 64, 66, or more particularly, the first and second terminals 68, 70. FIG. 8a illustrates the conducting band 76 being positioned relative to the first and second terminals 68, 70 such that the first and second terminals 68, 70 are electronically connected and current flow is possible through the electric element 24 if the positive power supply is connected and active. FIG. 8b illustrates the conducting band 76 being positioned above the first and second terminals 68, 70 such that the first and second terminals 68, 70 are electronically disconnected and current flow is impossible through the electric element 24, regardless of whether the positive power supply is connected are active. Force from an element against the collar 52, a spring (not shown), or other feature may be included or operated in cooperation with the actuator 10 to facilitate moving the collar 52 along the housing 12.

One non-limiting aspect of the present invention, as generally described above, relates to a rotational based actuator configured to impart linear movement. The actuator may be suitable for use in any number of applications where a disk or other feature may be rotated over a wedge to impart linear movement. The forces used to generate the rotation movement may be imparted by the wedge against an element, causing the element to move linearly with the disk. The wedging effect may be provided by a protuberance on the disk operating with an incline on the housing, the housing may include the protuberance and the disk may include the incline, and/or some combination thereof.

The actuator shown in the Figures and generally described above is configured to operate with piston or the other object that must run through the actuator such that the actuator is required to include a hollow and circular center portion. The present invention, however, is not intended to be so limited and is not intended to be limited to a housing have a hollow center portion. The present invention fully contemplates the housing and/or disk to be solid and/or hollow features capable of imparting linear movement to any type of element. accordingly, the present invention contemplates utilizing the rational aspect of the present invention impart linear movement, regardless of the size, shape, or configuration of the housing, disk, collar, or other features described in accordance with the present invention.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An actuator comprising:
a housing having an incline within a receptacle;
a disk having a protuberance positioned within the receptacle; and
an electric element wrapped around at least a portion of the disk, the electric element configured to rotate the disk when electrically stimulated, the disk rotation causing the protuberance to rotate over the incline and move the disk linearly within the receptacle.

2. The actuator of claim 1 wherein the linear movement of the disk is limited to a height of the incline.

3. The actuator of claim 1 wherein the electric element only rotates the protuberance partially up the incline such that the protuberance is free to fall back down the incline when the electrical excitation is removed.

4. The actuator of claim 1 wherein the electric element is a smart memory alloy (SMA).

5. The actuator of claim 1 wherein the electric element is a wire wrapped in a u-shape around the disk.

6. The actuator of claim 1 wherein the receptacle is located proximate at least one opening at an end of the housing such that the disk can be inserted through the opening for receipt within the receptacle, wherein the receptacle includes a shoulder smaller in size than the opening within which the incline is formed.

7. The actuator of claim 1 wherein the disk and receptacle are circular.

8. The actuator of claim 1 further comprising a switching element configured to facilitate electrically connecting a positive connection of the electric element with a negative connection in order to facilitate electrically stimulating the electric element.

9. The actuator of claim 8 wherein the switching element is a collar having an electronically conducting band, the collar being configured to move linearly along the housing between at least a first position and a second position, the first position corresponding with the band electrically connecting the positive connection with the negative connection and the second position corresponding with the band electrically disconnecting the positive connection from the negative connection.

10. The actuator claim 9 wherein the connections are located within the housing and the collar surrounds an exterior portion of the housing, wherein the housing includes openings which expose spring biased connection protuberances included as part of the connections beyond the exterior surface of the housing for contact with the band.

11. The actuator of claim 10 wherein the disk is located at a top portion of the housing and the collar is located at a bottom portion of the housing such that the disk and collar never overlap and wherein a portion of both of the connections extend between the top and bottom portions of the housing to facilitate electrically connecting the electric element with the collar.

12. The actuator of claim 1 wherein the disk includes three equally spaced and sized protuberances.

13. The actuator of claim 12 wherein the housing includes three equally spaced and sized inclines to correspond with the three protuberances.

14. An actuator comprising:
a housing defining an axis;
an electric element configured to contract in response to electrical stimulation;
a first feature positioned to rotate about the axis in response to contraction of the electric element so as to cause the first feature to wedge against the housing in a direction along the axis; and
a second feature configured to facilitate electrically connecting a positive connection of the electric element with a negative connection, the electric element being stimulated when the positive connection is connected to the negative connection and the electric element not being stimulated when the positive connection is disconnected from the negative connection, the second feature being movable along the axis to facilitate connecting and disconnecting the negative connection relative to the positive connection.

15. The actuator of claim 14 wherein the first feature is located within the housing and wherein the second feature is located outside the housing.

16. A system of moving a slide collar of a seat fold actuator, the system comprising:
a housing having a hollow center for receipt of the slide collar, the housing defining an axis along which the slide collar moves;
a disk within the housing and configured to rotate about the axis between a bottom portion of the slide collar and a shoulder of the housing, the disk having a protuberance and the housing having an incline sunken below the shoulder such that rotation of the disk about the axis causes the protuberance to climb the incline linearly in a direction along the axis to move the slide collar in the same direction; and
a controller configured to control electrical stimulation of an electric element wrapped around the disk so as to control rotation of the disk, wherein the controller is configured to control the electrical stimulation to facilitate movement of the disk from a seated position, which corresponds with the protuberance resting against a bottom of the incline and below the shoulder, to at least a first position, which corresponds with the disk moving a first distance away from the shoulder, as a function of a first current supplied to the electric element.

17. The system of claim 16 wherein the controller is configured to control the electrical stimulation to facilitate movement of the disk from the seated position to a second position, which corresponds with the disk moving a second distance away from the shoulder, as a function of a second current supplied to the electric element, the first position being different than the second position.

18. The system of claim 16 wherein the electric element is a wire wrapped at least partially around and below an outer surface of the disk.

19. The system of claim 18 further comprising a collar configured to facilitate electrically connecting a positive connection of the electric element with a negative connection, the wire being electrically stimulated when the positive connection is connected to the negative connection and the wire not being electrically stimulated when the positive connection is disconnected from the negative connection, the collar being movable along the axis to facilitate connecting and disconnecting the negative connection relative to the positive connection.

* * * * *